United States Patent
Hughes et al.

(10) Patent No.: US 7,277,627 B2
(45) Date of Patent: Oct. 2, 2007

(54) ROOFTOP WATER HEATER

(75) Inventors: Dennis R. Hughes, Hartford, WI (US); Kevin M. Field, Oconomowoc, WI (US)

(73) Assignee: AOS Holding Company, Wilmington, DE (US)

( * ) Notice: Subject to any disclaimer, the term of this patent is extended or adjusted under 35 U.S.C. 154(b) by 715 days.

(21) Appl. No.: 10/369,421

(22) Filed: Feb. 18, 2003

(65) Prior Publication Data

US 2003/0123863 A1 Jul. 3, 2003

Related U.S. Application Data

(63) Continuation-in-part of application No. 10/274,183, filed on Oct. 18, 2002, now Pat. No. 6,679,014, which is a continuation of application No. 09/732,472, filed on Dec. 7, 2000, now Pat. No. 6,591,788.

(51) Int. Cl.
*A47J 27/00* (2006.01)

(52) U.S. Cl. ............... 392/441; 392/307; 126/638

(58) Field of Classification Search ......... 392/441–449, 392/307; 126/638, 646, 628, 344, 391.1
See application file for complete search history.

(56) References Cited

U.S. PATENT DOCUMENTS

| | | |
|---|---|---|
| 1,847,431 A | 3/1932 | Hana |
| 3,028,843 A | 4/1962 | Carlson et al. |
| 3,903,868 A | 9/1975 | Salvo |
| 4,232,656 A | 11/1980 | Teagan |
| 4,344,645 A * | 8/1982 | Kirk ............... 285/61 |
| 4,414,464 A | 11/1983 | Cloutier |
| 4,497,281 A | 2/1985 | Markus |
| 4,501,232 A | 2/1985 | Gordbegli et al. |
| 4,637,347 A * | 1/1987 | Troy ............... 122/15.1 |
| 4,771,762 A | 9/1988 | Bridegum |
| 4,785,792 A | 11/1988 | Saint Laurent |
| 4,809,523 A | 3/1989 | Vandenberg |
| 4,867,106 A | 9/1989 | Staats |
| 4,875,465 A | 10/1989 | Kramer |
| 4,917,077 A | 4/1990 | Scanferla |
| 4,938,204 A | 7/1990 | Adams |
| 4,981,112 A | 1/1991 | Adams et al. |
| 5,582,026 A | 12/1996 | Barto, Sr. |
| 5,713,310 A | 2/1998 | Lemke |
| 5,749,415 A | 5/1998 | Dinh |
| 5,761,379 A | 6/1998 | Lannes |
| 5,915,960 A | 6/1999 | Check et al. |
| 6,062,174 A | 5/2000 | Abe |

FOREIGN PATENT DOCUMENTS

JP 2000304351 A 11/2000

* cited by examiner

*Primary Examiner*—Thor S. Campbell
(74) *Attorney, Agent, or Firm*—Michael Best & Friedrich LLP

(57) ABSTRACT

A water heater adapted to be positioned outside of a building and to interface with the plumbing system of the building. The water heater includes a water storage tank adapted to store water outside of the building, a means for heating the water in the tank, a base member supporting the tank outside of the building, and a plurality of water pipes communicating with the water tank. The water heater also includes a manifold that is mounted to the base member and includes a plurality of pipe unions adapted to interface between the plumbing system and the plurality of pipes to provide cold water to the tank and to remove heated water from the tank for use in the building.

40 Claims, 12 Drawing Sheets

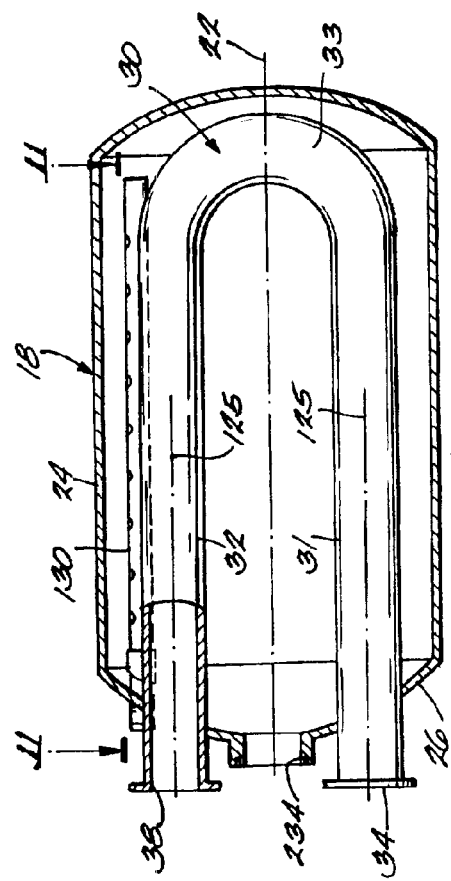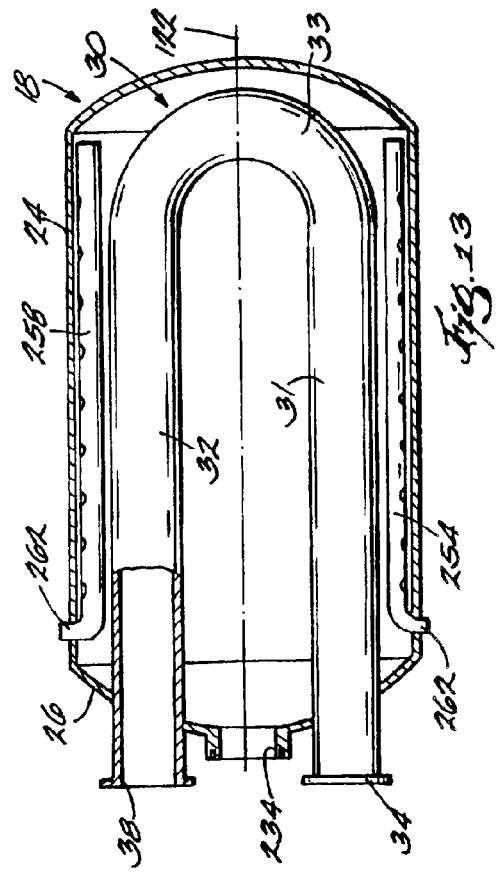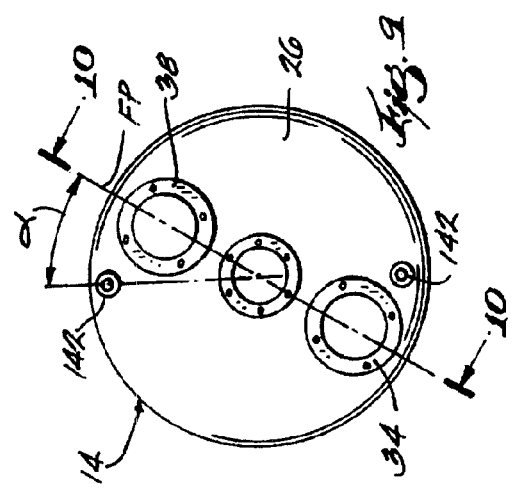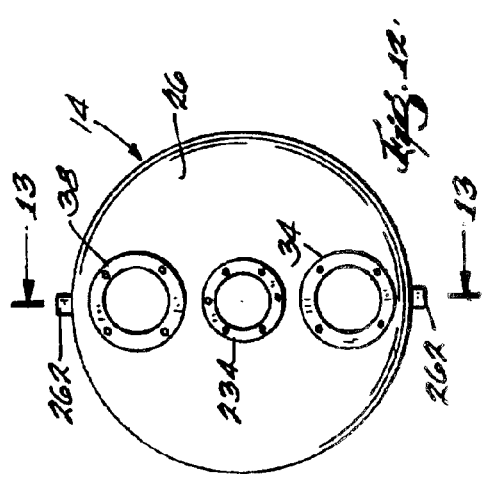

ROOFTOP WATER HEATER

CROSS-REFERENCE TO RELATED APPLICATIONS

This application is a continuation-in-part of U.S. application Ser. No. 10/274,183, filed Oct. 18, 2002, U.S. Pat. No. 6,679,014 which is a continuation of U.S. application Ser. No. 09/732,472, filed Dec. 7, 2000 now U.S. Pat. No. 6,591,788. The entire contents of these related applications are incorporated by reference herein.

FIELD OF THE INVENTION

The invention relates to water heaters, and more particularly to water heaters adapted to be mounted on the roof of a building.

BACKGROUND

It is known to provide a water heater within a building, and to mount other equipment (e.g., HVAC equipment) on the roof of a building. A primary concern with rooftop equipment is the load imposed on the roof by the weight of the equipment. Most rooftop equipment is supported on the roof by a roof curb. The roof curb provides a weather-tight seal between the equipment and the roof, and distributes the weight load of the equipment to the building's roof. The roof curb also prevents leakage of water into the building and equipment in the event of a roof flood. Roof curbs are typically built to match the pitch of the roof so that the equipment mounts on a level surface. Rooftop equipment is typically raised to the roof with a crane and set on the roof curb. A foam sealing tape is often used between the bottom of the equipment and the roof curb to provide a weather-tight seal.

Many commercial buildings include a wall around the rooftop to screen the rooftop equipment from view. Much of the HVAC equipment currently installed on rooftops is enclosed in a rectangular cabinet, and has a sufficiently low profile to be not visible from the ground level.

SUMMARY

The present invention identifies several advantages to providing a water heater on the roof of a building. In commercial applications, one factor affecting many aspects of some businesses, and particularly retail and restaurant businesses, is floor space. Moving a water heater out of a building and positioning it on the building's roof may permit more floor space to be used for conducting business. In addition to potentially freeing up floor space and the need for a separate boiler room in a building, the present invention provides other advantages over interior water heaters. A rooftop water heater embodying the present invention may make design and maintenance simpler and cheaper in some instances when compared to the design and maintenance of interior water heaters.

Several design parameters are imposed on the design of a rooftop water heater by weather conditions and the expectations of potential purchasers of such water heaters. The water heater must first account for weather conditions not normally encountered by interior water heaters. It would be desirable to mount the water heater on a weather-tight roof curb that would support the water heater above expected water levels in the event of a roof flood. The roof curb would also provide the required weight load distribution to the roof. Because roof curbs are already used to support other rooftop equipment, it is convenient to use a roof curb to support a rooftop water heater as well.

To maintain the aesthetics of their buildings, purchasers would likely want equipment that cannot be ordinarily seen from the ground level. The water heater therefore must have a sufficiently low profile and be of substantially the same height as most HVAC equipment to meet the expected demands of purchasers.

In light of the foregoing considerations, one embodiment of the present invention includes a water heater adapted to be positioned outside of a building and to interface with the plumbing system of the building. The water heater includes a water storage tank adapted to store water outside of the building, a means for heating the water in the tank, a base member supporting the tank outside of the building, and a plurality of water pipes communicating with the water tank. The water heater also includes a manifold that is mounted to the base member and includes a plurality of pipe unions adapted to interface between the plumbing system and the plurality of pipes to provide cold water to the tank and to remove heated water from the tank for use in the building.

Another embodiment of the invention includes a water heater having a water storage tank adapted to store water outside of the building, a gas burner, and a flue tube within the tank communicating with the gas burner for the flow of hot products of combustion from the burner through the flue tube to heat water in the tank. The water heater also includes a cabinet surrounding the tank and supporting the tank outside of the building. A vent communicates with the flue tube for the removal of the products of combustion from the flue tube and out of the cabinet. The vent includes first and second ducts within the cabinet and extending through first and second sides, respectively, of the cabinet.

An additional embodiment of the invention includes a water heater assembly having a water heater, a cabinet surrounding the water heater, and a manifold. The water heater includes a water storage tank adapted to store water outside of the building, a means for heating the water in the tank, and a plurality of water pipes communicating with the water tank. The manifold is mounted to the cabinet to interface between the plumbing system and the plurality of pipes to provide cold water to the tank within the cabinet and to remove heated water from the tank and the cabinet for use in the building.

Other features and advantages of the invention will become apparent to those skilled in the art upon review of the following detailed description, claims, and drawings.

BRIEF DESCRIPTION OF THE DRAWINGS

FIG. 9 is an end view of the tank assembly of FIGS. 4 and 7.

FIG. 10 is a side cross-section view of the tank assembly taken along line 10—10 in FIG. 9.

FIG. 12 is an end view of a tank assembly of an alternative construction.

FIG. 13 is a side cross-section view taken along line 13—13 in FIG. 12.

Figure 1:
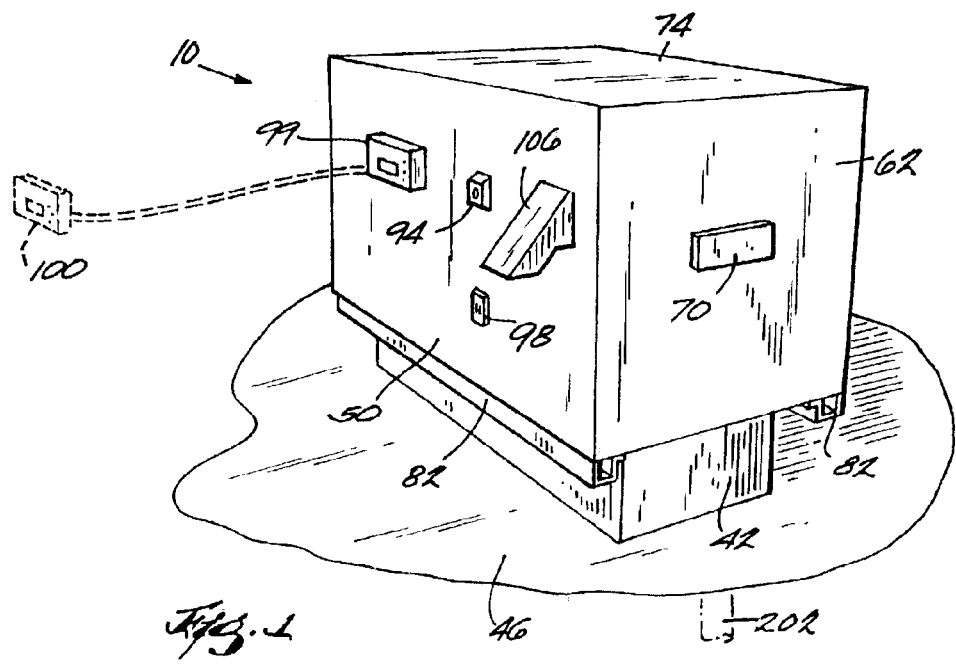
FIG. 1 is a perspective view of a water heater embodying the present invention.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Figure 2:
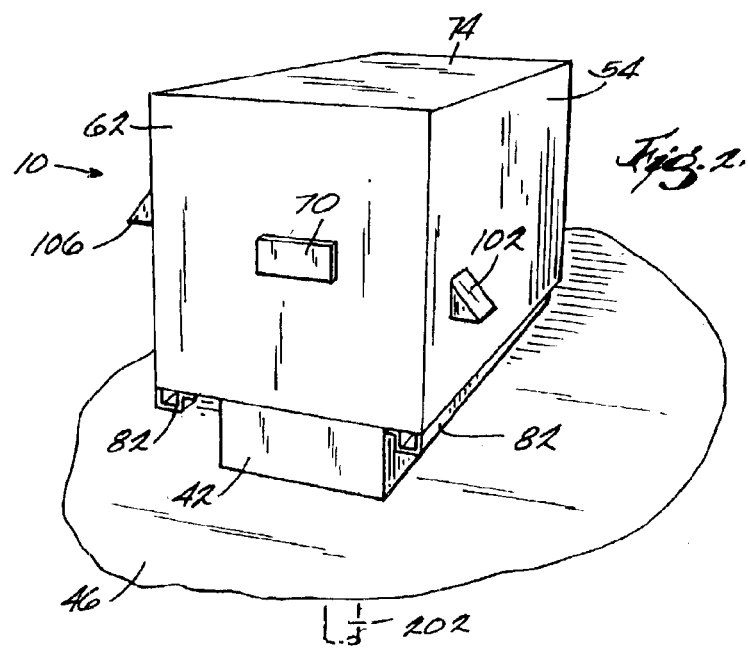
FIG. 2 is a view of the water heater of FIG. 1 from a different perspective.
Figure 3:
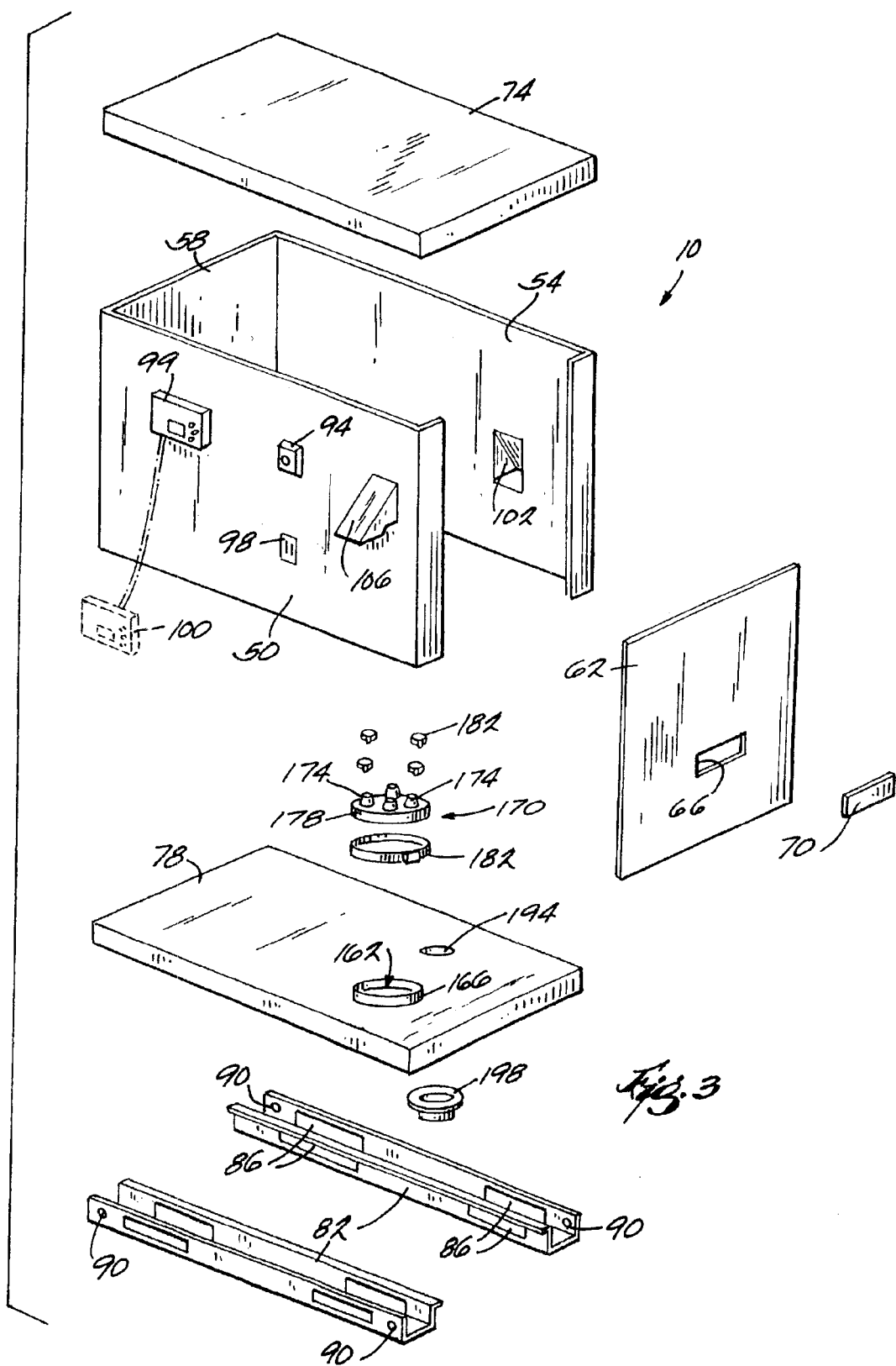
FIG. 3 is an exploded view of the cabinet of the water heater of FIG. 1.

The present invention is embodied in a water heater including a cabinet 10 illustrated in FIGS. 1–3 and a tank assembly 14 illustrated in FIGS. 4–13. A first construction of the tank assembly 14 is illustrated in FIGS. 4–11. With particular reference to FIGS. 9 and 10, the tank assembly 14 includes a tank 18 having a substantially cylindrical shape and a horizontally-extending longitudinal axis 22. The tank 18 includes a shell 24 that is closed at one end by a head 26. A U-shaped flue tube 30 is positioned within the tank 18. The U-shaped flue tube 30 includes two legs 31, 32 communicating through a curved or bent portion 33. The legs 31, 32 terminate in a burner end 34 and an exhaust end 38, respectively, both of which extend through the head 26.

Turning to FIGS. 1–3, the cabinet 10 is mounted on a roof curb 42 on a rooftop 46 of a building, and encloses the tank assembly 14. The cabinet 10 is generally rectangular in shape, having its major axis extending generally horizontally. In this regard, the cabinet 10 has a generally low profile and is similar to other rooftop units such as typical HVAC (e.g., air conditioning) units. As used herein, "low profile" means that the rooftop water heater cabinet 10 cannot typically be seen by a person of average height standing at ground level from a distance of about one city block. The low profile therefore permits the unit to be mounted on a rooftop without detracting from the aesthetics of the building. Roof rails and a pitch pocket or small roof curb may be used as an alternative mounting structure to the roof curb 42 illustrated.

As seen in FIG. 3, the cabinet 10 includes two side panels 50, 54 arranged generally parallel to each other and at right angles to a third side panel or end panel 58. A second end panel or cabinet door 62 is releasably attached at right angles to the two side panels 50, 54 and generally parallel to the end panel 58. The door 62 includes a cutout 66 and a recessed or raised handle 70 to facilitate removal of the door 62 from the rest of the cabinet 10 without the use of tools. An upper panel or top 74 is releasably affixed to the top edges of the other panels 50, 54, 58, 62 of the cabinet 10. The top 74 is preferably removable from the rest of the cabinet 10 without the use of tools. Preferably the door 62 and top 74 are locked to the other panels 50, 54, 58 to resist tampering with the tank assembly 14.

A base member 78 supports the cabinet panels 50, 54, 58, 62, 74 and provides the bottom of the cabinet 10. The base member 78 is supported by the roof curb 42, and a foam tape or other sealing member is preferably interposed between the roof curb 42 and the base member 78 to create a water-tight seal therebetween. A pair of rails 82 are mounted to the underside of the base member 78 and straddle the roof curb 42. The rails 82 define channels along their lengths into which the prongs of a conventional fork lift may be inserted for lifting and lowering the water heater, and also include slots 86 to insert the forklift prongs transverse to the channels. The rails 82 also include apertures 90 for attaching the hooks of a lifting crane to facilitate lifting the water heater to the roof 46 of the building.

When the top and door 74, 62 are removed, the tank assembly 14 is sufficiently exposed to permit a service technician to perform service on the water heater. An electrical disconnect button 94 (FIG. 1) is mounted to one of the side panels 50. The disconnect button 94 permits the service technician to conveniently connect and disconnect power to the water heater while the technician is on the rooftop 46. An electrical outlet 98 (FIG. 1) is also provided to accommodate a service technician's power tools and electric lights. Another feature of the water heater is the provision of local and remote controllers 99, 100, respectively, that include thermostats. The local controller 99 may be mounted on the side panel 50 as illustrated, or it may be mounted within the cabinet 10. The remote controller 100 is mounted in a desirable place within the building. The local and remote controllers 99, 100 each include a digital display of the water temperature within the tank 18, and permit adjustment of the temperature. Thus, the water heater may be monitored and controlled from both the rooftop 46 and from within the building. This arrangement creates convenience for both the building owner or occupant within the building and a service technician on the rooftop 46.

The cabinet panels 50, 54, 58, 62, 74 are joined together around the tank assembly 14 in a weather-tight fashion. As used herein, "weather-tight" means that rain or other precipitation falling on the cabinet 10 from above are substantially prevented from entering the cabinet 10 and interfering with the operation of the water heater. For example, one of the side panels 54 includes an air inlet vent 102 that opens downwardly to cause precipitation to run off the cabinet 10, and the other side panel 50 includes a downwardly-opening exhaust vent 106. In addition to being weather-tight, the edges of the cabinet panels 50, 54, 58, 62, 74 are preferably substantially water-tightly joined to each other (e.g., by welding or with gasket material) to resist or prevent water from entering the cabinet 10 and interfering with the operation of the water heater. For example, the panels 50, 54, 58, 62 can be connected to each other with the use of mating tongue and groove connections such that one edge of a panel 50, 54, 58, 62 can be slid into a groove formed in the edge of an adjacent panel 50, 54, 58, 62.

Figure 4:
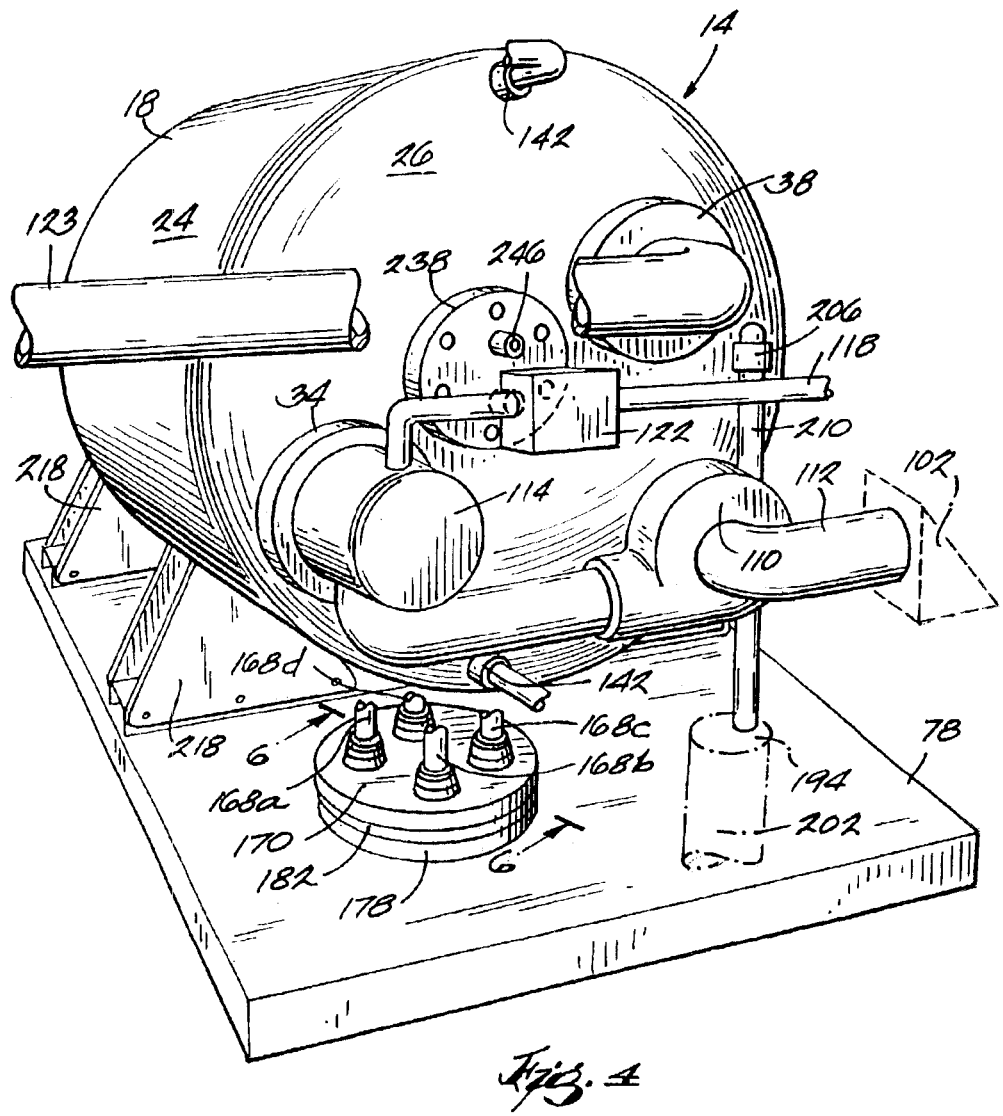
FIG. 4 is a perspective view of the tank assembly of the water heater of FIG. 1.

Turning now to FIG. 4, the tank assembly 14 will be discussed in more detail. A fan or combustion blower 110 communicates with the air inlet vent 102 through an inlet duct 112 to deliver air from outside the cabinet 10 to a gas fuel burner 114 positioned at the burner end 34 of the flue tube 30. Gas fuel is also delivered to the burner 114 via a gas pipe 118 and regulator 122. The burner 114 causes combustion of the air and gas fuel, and the products of combustion are forced through the flue tube 30 by the combustion blower 110. The products of combustion heat the water in the tank 18 through the wall of the flue tube 30, and then exit the exhaust end 38 of the flue tube 30. The exhaust vent 106 communicates with the exhaust end 38 of the flue tube 30 through an exhaust duct 123 to permit the spent products of combustion to be exhausted to the surrounding atmosphere.

Figure 8:
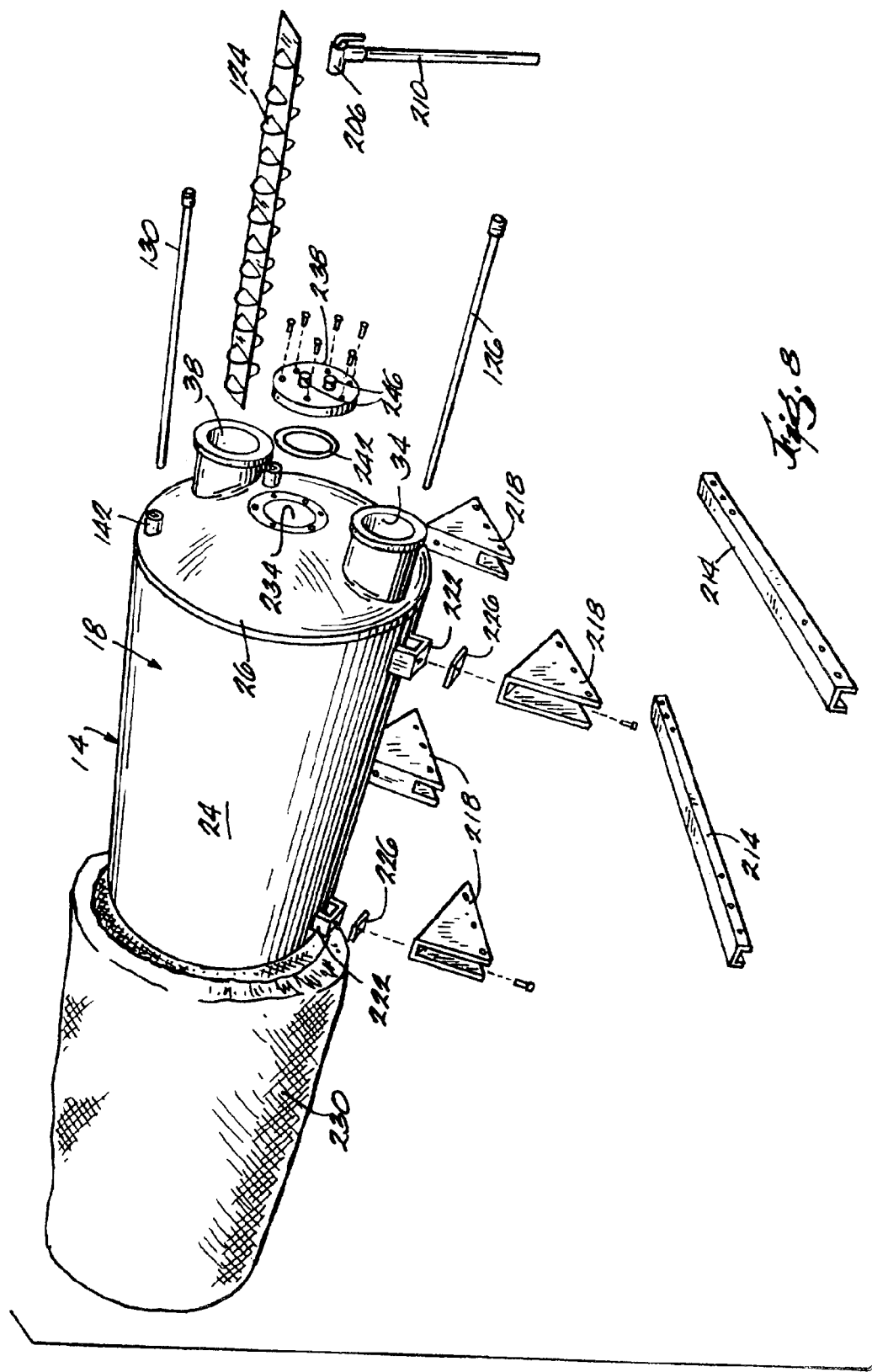
FIG. 8 is an exploded view of the tank assembly of FIGS. 4 and 7.
Figure 14:
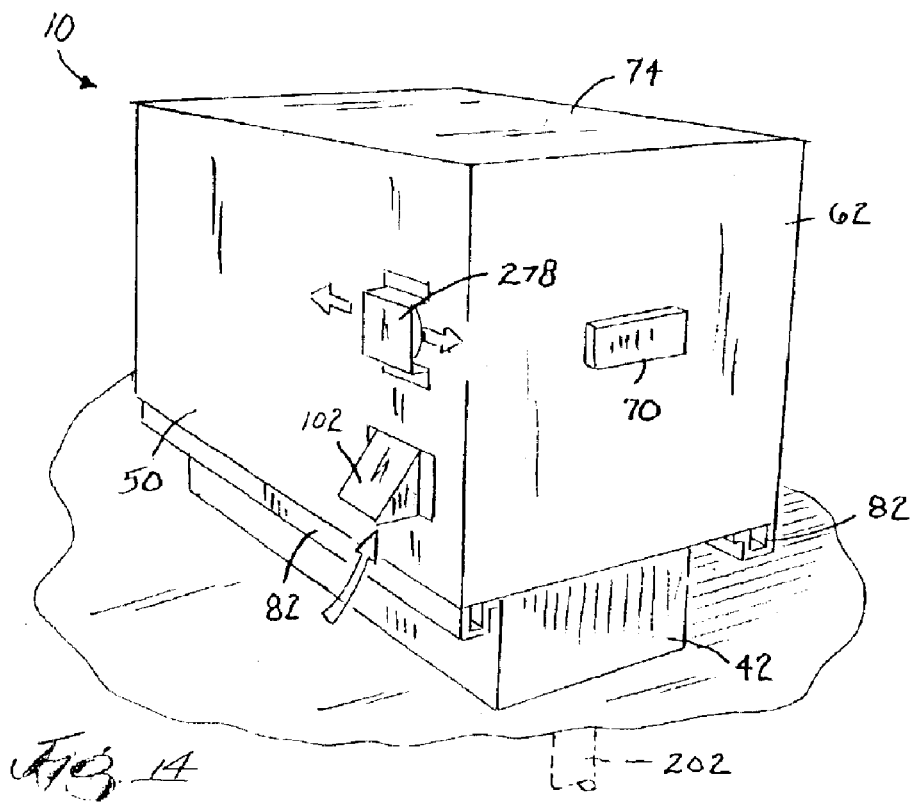
FIG. 14 is a perspective view of a water heater according to an additional embodiment of the present invention.
Figure 15:
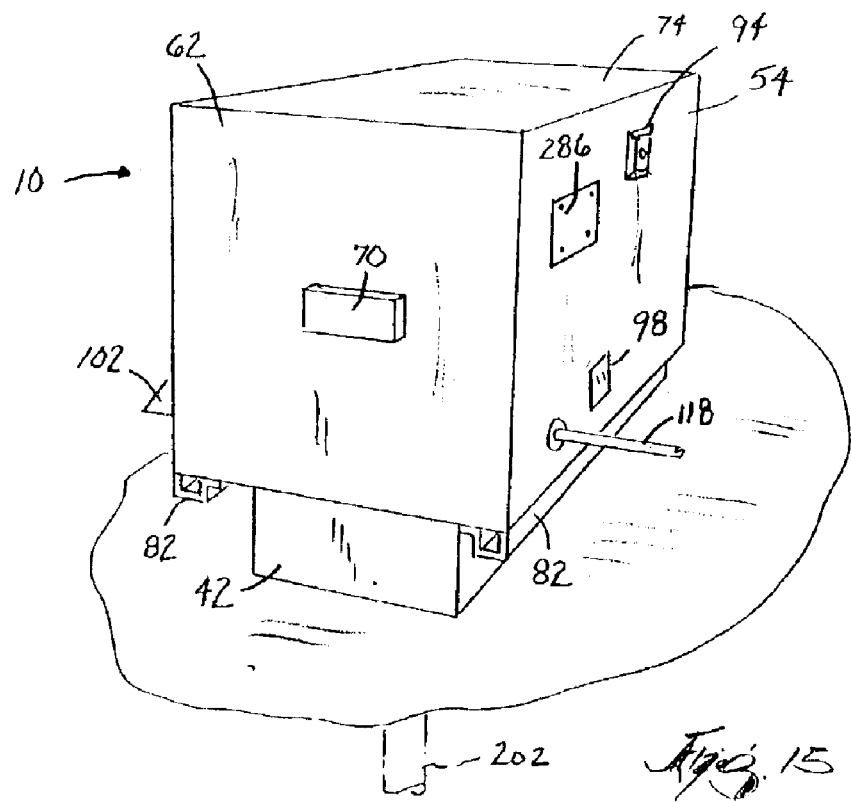
FIG. 15 is a view of the water heater of FIG. 14 from a different perspective.

With additional reference to FIG. 8, a baffle or turbulator 124 is positioned within one of the legs 31, 32 of the U-shaped flue tube 30, and preferably in the upper leg 32. The legs 31, 32 each include a longitudinal axis 125 (FIG. 10), and the longitudinal axes 125 together define a flue plane FP (FIG. 9) that may be disposed substantially vertically, or may be angled with respect to vertical an angle labeled α. Preferably, the angle α is between 30–60° with respect to vertical.

Referring to FIGS. 8–11, an inlet tube 126 and outlet tube 130 are also mounted in the head 26, and extend substantially parallel to the longitudinal axis 22 of the tank 18. The inlet tube 126 is positioned in the bottom portion of the tank 18 below the longitudinal axis 22, and the outlet tube 130 is positioned in the top portion of the tank 18 above the longitudinal axis 22. Preferably, the inlet tube 126, outlet tube 130, and longitudinal axis 22 of the tank 18 are aligned parallel to each other in a vertical plane. This arrangement is made possible in part because the flue plane angle α is greater than zero (i.e., the flue plane FP is non-vertical), which moves the legs 31, 32 of the flue tube 30 from a position in which they would interfere with the extension of the inlet and outlet tubes 126, 130. The tubes 126, 130 are substantially identical to each other and preferably have a length 132 (FIG. 11) slightly shorter than or substantially the same as the interior length 134 of the tank 18 so that cold water is provided and hot water is removed along the entire interior length 134 of the tank 18. The preferred length 132 is between about 37 and 38 inches, but the length 132 will vary depending on the dimensions of the water tank 18. A threaded end 138 is attached at one end of the tubes 126, 130. The threaded end 138 is threaded into a threaded spud 142 in the tank head 26, and includes additional threads to receive a nipple, water pipe, or other plumbing fixture. In a less preferred embodiment, one or both of the tubes 126, 130 may be significantly shorter than illustrated, or the outlet tube 130 may be removed, leaving only the conventional spud 142 to which the building's hot water pipe communicates.

The end 146 opposite the threaded end 138 is closed. The tubes 126, 130 include a plurality of holes, apertures, or openings 150 along their lengths. The tubes 126, 130 preferably have an outer diameter of about one inch, with the holes 150 having a diameter of about 0.25 inches. The hole spacing 154 is preferably about five inches, with the last hole being spaced from the closed end 146 a distance 158 of about 0.5 inches.

In the illustrated construction, all of the openings 150 in the inlet tube 126 face down and all of the openings 150 in the outlet tube 130 face up. Thus, the inlet tube 126 directs cold water toward the bottom of the tank 18 and the outlet tube 130 draws hot water from the top of the tank 18. This is advantageous because the hottest possible water is drawn from the top by the outlet tube 130 while the inlet tube 126 introduces cold water directly at the bottom of the tank 18. The inlet tube 126 therefore evenly distributes water at the bottom of the tank to minimize mixing and thereby maximize heated water drawn from the tank 18. In alternative less preferred constructions, the openings 150 may be arranged around the periphery of the tubes 126, 130 instead of opening in only one direction.

Figure 6:
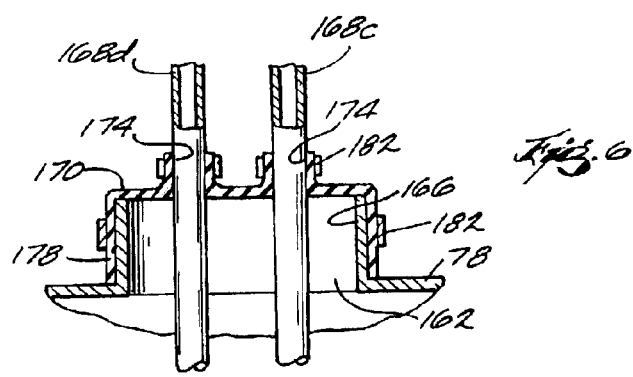
FIG. 6 is a cross-section view taken along line 6—6 in FIG. 4.
Figure 11:
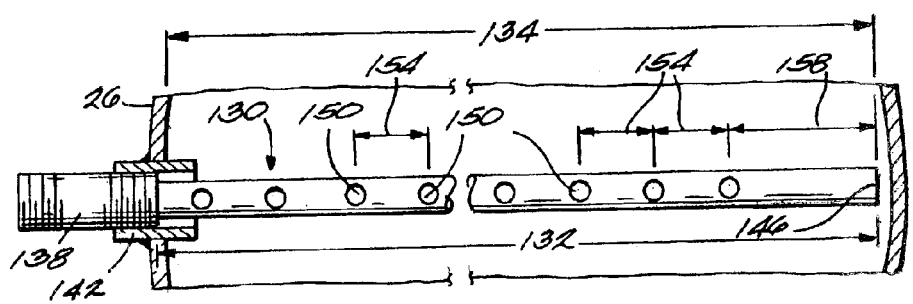
FIG. 11 is a view of the outlet tube taken along line 11—11 in FIG. 10.

As can be seen in FIGS. 3, 4, and 6, the base member 78 includes a water pipe aperture 162 surrounded by a vertical wall 166. Four water pipes 168a, 168b, 168c, 168d (collectively referred to as 168) extend up from the building, through the roof curb 42, and through the aperture 162, and communicate with the water tank 18. A grommet 170 includes apertures 174 water-tightly slip fit around the water pipes 168, and has a depending wall 178 (FIG. 6) water-tightly slip fit over the vertical wall 166. The grommet 170 therefore provides a water-tight seal between the pipes 168 and the base member 78. Suitable clamps 182 can be employed to further tighten the grommet 170 around the vertical wall 166 and pipes 168.

Figure 5:
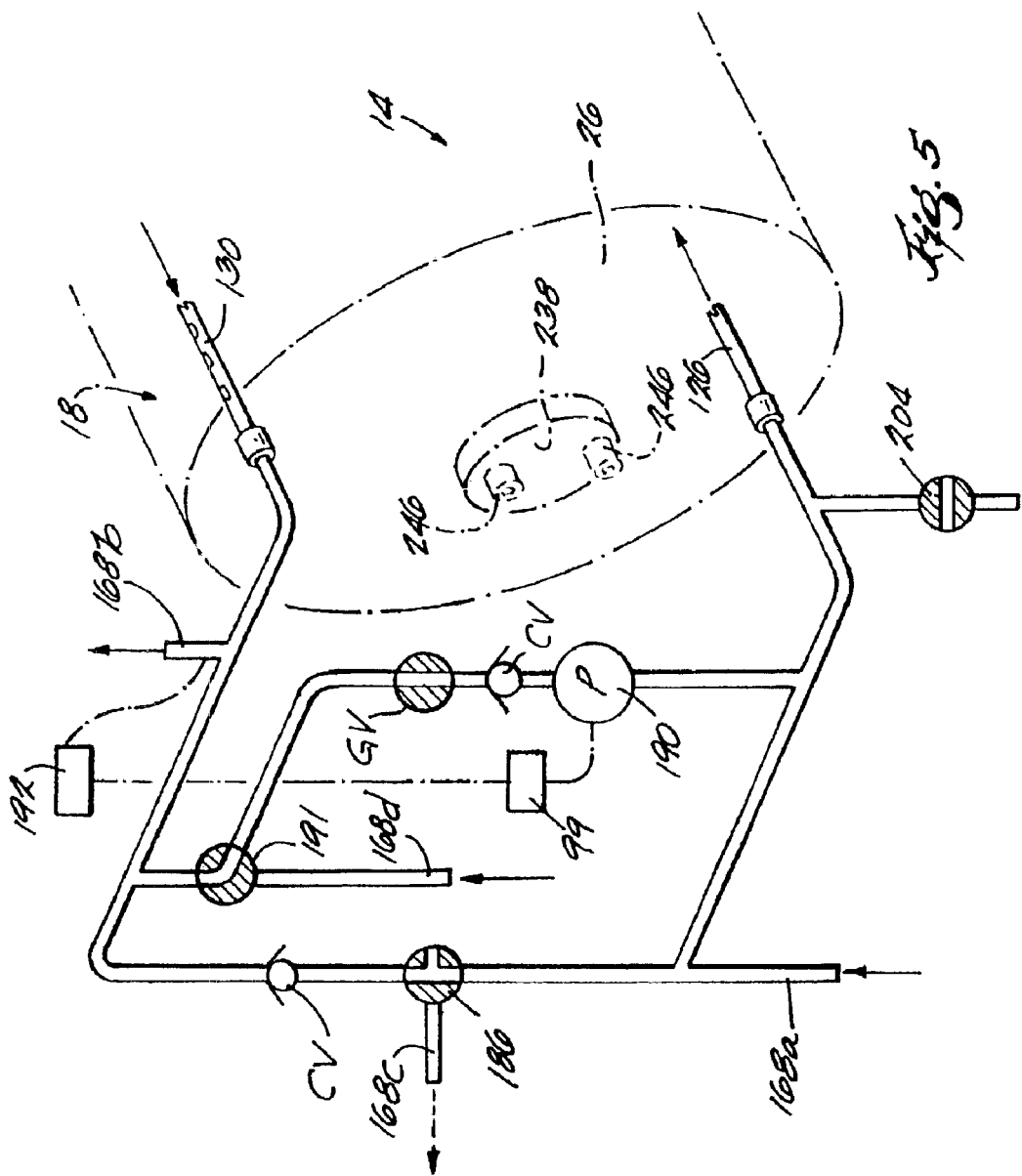
FIG. 5 is a schematic illustration of the piping system associated with the tank assembly of FIG. 4.
Figure 7:
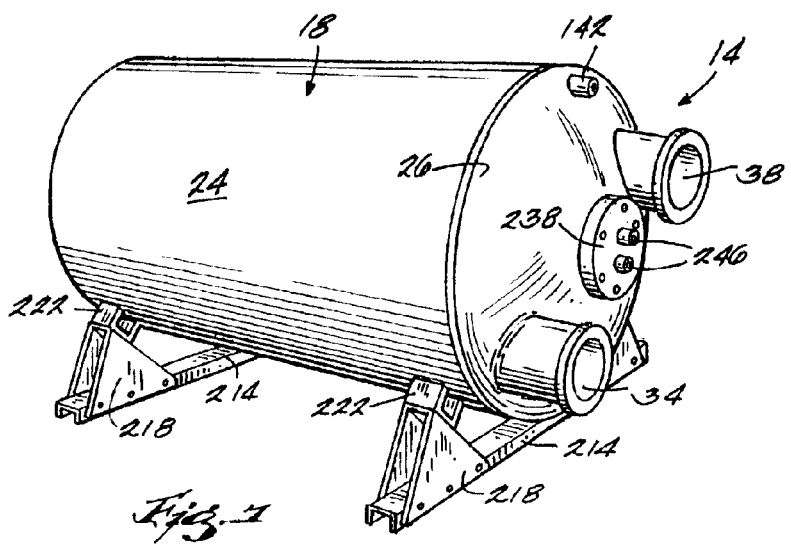
FIG. 7 is a perspective view of the tank assembly of FIG. 4 with selected elements removed for the purpose of illustration.

FIGS. 4–6 illustrate the piping system associated with the tank assembly 14. One of the water pipes 168a provides cold water to the water inlet tube 126. Another water pipe 168b removes hot water from the tank 18 through the outlet tube 130, and this hot water is used for dishwashers and other applications requiring very hot water (e.g., between about 120° F. and about 150° F., or a higher temperature if necessary). Another water pipe 168c communicates with a mixing valve 186, and delivers a mixture of hot water and cold water to the warm water faucet of the building's bathrooms and kitchen sink.

The last water pipe 168d communicates between the building's hot water pipes and a circulation pump 190. The circulation pump 190 performs two functions. First, the circulation pump 190 is turned on by the controller 99 (FIG. 1) each time the combustion blower 110 is turned on, and remains active for a set period of time (e.g., about nine minutes) after the combustion blower 110 is turned off. A bypass valve 191 is actuated to route water from the outlet tube 130, through the circulation pump 190, and back into the tank 18 through the inlet tube 126. In this manner, the circulation pump 190 causes hot water to be drawn off the top of the water tank 18 through the outlet tube 130 and recirculated through the cold inlet tube 126 to even out the temperature of the water in the tank 18 and reduce the effects of stacking.

The second function of the circulation pump 190 is to maintain a supply of hot water in the pipes of the building. A thermostat 192 (FIG. 5) may be employed to determine when the temperature in the building's hot water pipes has dropped below an desired temperature (e.g., when a hot water draw has not occurred for an extended period of time). In this case, the bypass valve 191 is turned to permit the circulating pump 190 to circulate the water in the building's hot water pipes into the inlet pipe 126, which forces hot water out the outlet pipe 130 and into pipe 168b. The hot water replaces the water in the building's hot water pipes. The piping system also includes check valves CV and an adjustable gate valve GV (which may be replaced with a fixed valve). The gate valve GV may be used to control the flow rate of recirculated water into and out of the water tank 18.

Referring again to FIG. 3, the base member 78 also includes a drain opening 194 that receives a drain member 198. The drain member 198 communicates with a drain pipe 202 (shown in phantom in FIGS. 1, 2, and 4) in the building, and the drain pipe 202 communicates with the building's sewage system. The drain opening 194 is the only opening in the base member 78 through which water is permitted to flow in the event of a water leak within the cabinet 10. Thus, any water flowing freely within the cabinet 10 drains through the drain opening 194 and is routed to the building's sewage. The tank assembly 14 also includes a drain valve 204 (FIG. 5) that permits the tank 18 to be drained. The valve 204 is preferably positioned over the drain opening 194.

As seen in FIGS. 4 and 8, the water heater also includes a temperature and pressure valve 206, which opens in the event the temperature of the water in the tank 18 becomes too high, or if unacceptable pressure levels are present within the tank 18. A hose or pipe 210 extends down from the temperature and pressure valve 206, and terminates above the drain opening 194. Water is drained from the top of the tank 18 and is fed into the building's sewage system in the event of an overtemperature or overpressure condition in the tank 18.

Referring again to FIGS. 7 and 8, the water tank assembly 14 also includes a pair of support rails 214 extending transverse to the longitudinal axis 22 of the tank 18, and a pair of wedge-shaped supports 218 welded or otherwise affixed to each support rail 214. Tank mounting brackets 222 are attached (e.g., welded) to the tank 18, and a thermally insulated spacer 226 is interposed between the tank mounting brackets 222 and the wedge-shaped supports 218. Suitable fasteners couple the supports 218 to the brackets 222. The tank 18 is surrounded with insulation 230 to reduce heat loss from the tank 18 to the ambient air. The head 26 includes an access opening 234 for cleaning the tank 18 and for applying a glass coating to the inside of the tank 18 during manufacture. An access cover 238 is mounted over the opening 234 and a gasket 242 is employed to prevent leakage of water through the access opening 234. A thermostat and/or an anode tube are mounted in spuds 246 in the access cover 238.

An alternative construction of the tank assembly 14 is illustrated in FIGS. 12 and 13. Here the flue plane FP is substantially vertical, and alternative inlet and outlet tubes 254, 258, respectively, are positioned below and above, respectively, the flue tube 30. A 90° elbow 262 is provided on both the inlet and outlet tube 254, 258 so that the tubes communicate with the building's pipes through the cylindrical shell 24 of the tank 18 and through the insulation 230, rather than through the head 26.

A water heater according to another embodiment of the present invention is illustrated in FIGS. 14–18. Reference numbers used with respect to the embodiments illustrated in FIGS. 1–13 are also used in FIGS. 14–18 to indicate like components.

Figure 16:
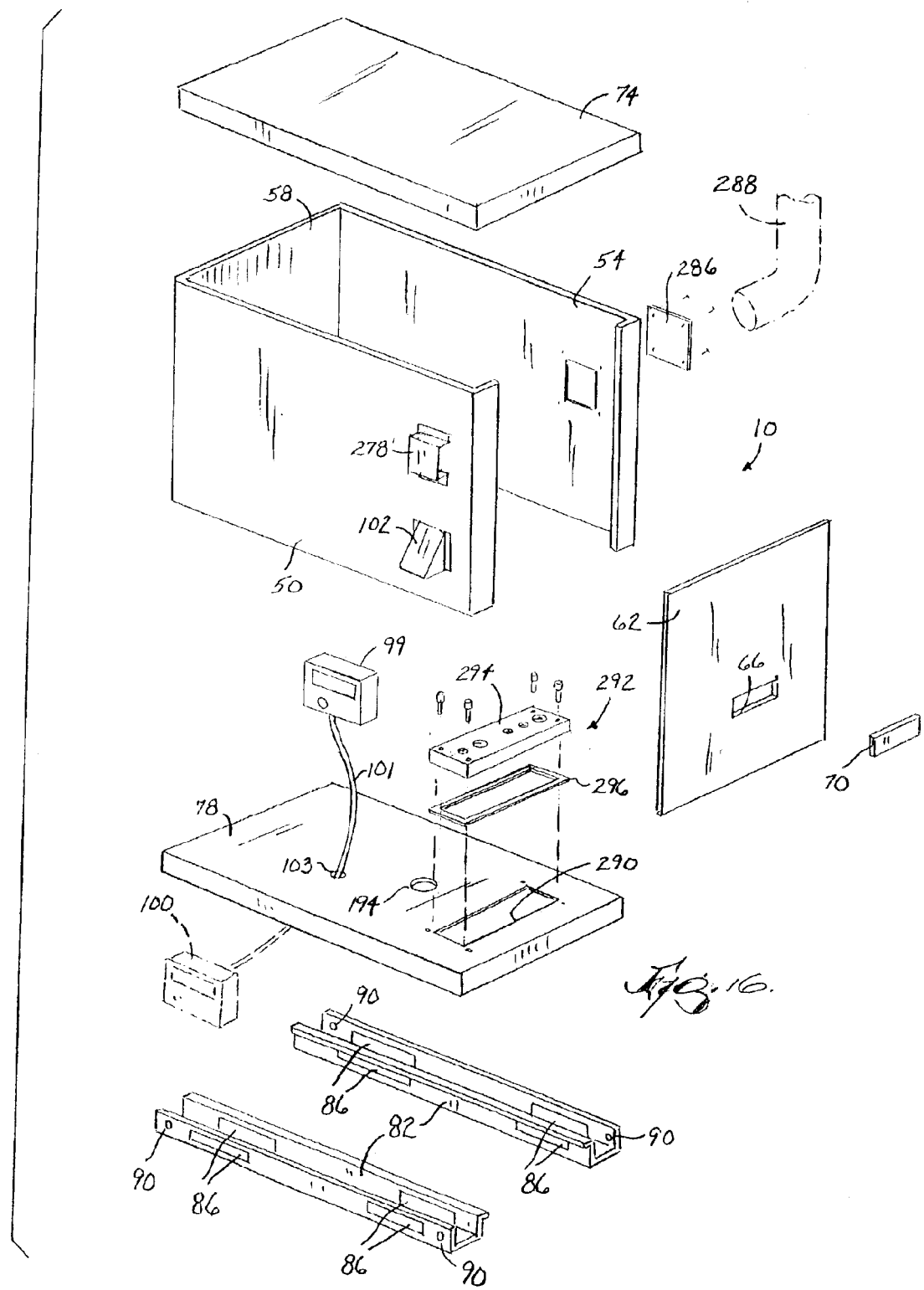
FIG. 16 is an exploded view of the cabinet of the water heater of FIG. 14.

As shown in FIG. 16, the water heater includes local and remote controllers 99, 100 respectively. The local controller 99 may be mounted adjacent to the tank 18 within the cabinet 10, and the remote controller 100 may be mounted in a convenient location within the building. The local controller 99 and the remote controller 100 are electrically connected through a cable 101 that extends through an aperture 103 in the base member 78. The cable 101 is water-tightly sealed within the aperture 103 to deter any water within the cabinet 10 from escaping through the aperture 103. The local and remote controllers 99, 100 each include a digital display of the water temperature within the tank 18, and permit adjustment of the temperature. Thus, the water heater may be monitored and controlled from both the rooftop and from within the building. This arrangement creates convenience for both the building owner or occupant within the building and a service technician on the rooftop.

The cabinet panels 50, 54, 58, 62, 74 are joined together around the tank assembly 14 in a weather-tight fashion. As discussed above, "weather-tight" means that rain or other precipitation falling on the cabinet 10 from above are substantially prevented from entering the cabinet 10 and interfering with the operation of the water heater. For example, one of the side panels 50 includes an air inlet vent 102 that opens downwardly to cause precipitation to run off the cabinet 10, and one of the side panels 50 includes a sidewardly-opening exhaust vent 278. In addition to being weather-tight, the edges of the cabinet panels 50, 54, 58, 62, 74 are preferably substantially water-tightly joined to each other (e.g., by welding or with gasket material) to resist or prevent water from entering the cabinet and interfering with the operation of the water heater.

Figure 17:
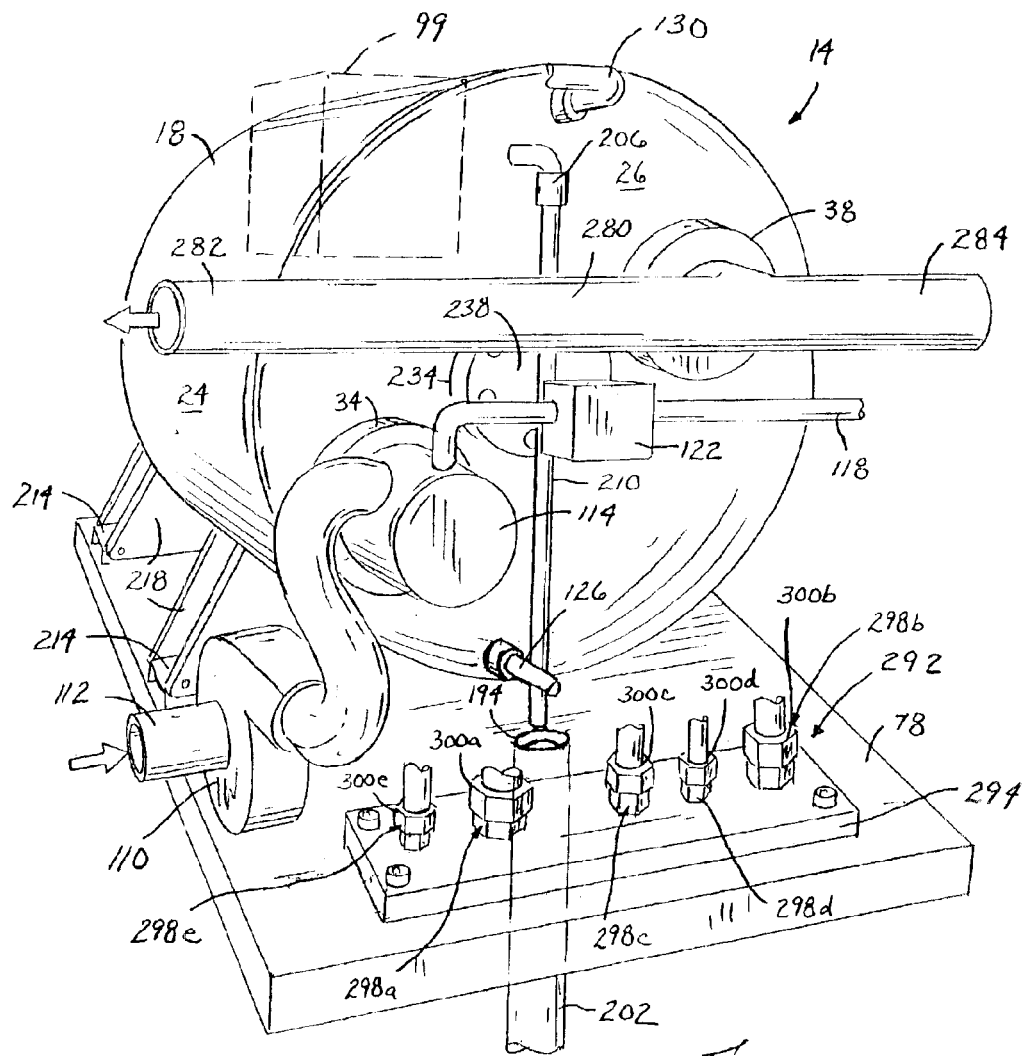
FIG. 17 is a perspective view of the tank assembly of the water heater of FIG. 14.

Turning now to FIG. 17, in this embodiment a T-shaped exhaust duct 280 is connected to the exhaust end 38 of the flue tube. The T-shaped exhaust duct 280 includes a first end 282 to deliver spent products of combustion in one direction through one of the side panels 50 and a second end 284 that delivers spent products of combustion in the opposite direction through the other side panel 54. The ends 282, 284 of the T-shaped duct 280 are connected to each other with a slip-fit connection that includes a sealing member to resist the escape of products of combustion through the slip-fit connection. The ends 282, 284 of the T-shaped duct 280 can be connected to exhaust vents 278 to deliver products of combustion out both side panels 50, 54 of the cabinet 10 to the surrounding atmosphere. Otherwise, one of the ends 282, 284 of the T-shaped exhaust duct 280 can be connected to a blocking plate 286 to prevent the products of combustion from exiting that side of the cabinet 10 and to thereby force all of the products of combustion out of the opposite side of the cabinet 10 through the opposite end 284, 282 of the T-shaped duct 280. The blocking plate 286 can be used when it is preferable to direct exhaust gases to one side of the cabinet 10, for example when one side of the cabinet 10 is open to the atmosphere and the other side of the cabinet 10 is obstructed. Also, a riser 288 (shown in phantom lines in FIG. 16) can be connected to the ends 282, 284 of the T-shaped exhaust duct 280 to elevate the exhaust over top of the cabinet 10.

As can be seen in FIGS. 16 and 17, the base member 78 includes a rectangular aperture 290. A manifold 292 is sealingly connected to the base member 78 to cover the aperture 290. The manifold 292 includes an adapter plate 294 and a gasket 296 interposed between the adapter plate 294 and the base member 78 to create a substantially water tight seal. The manifold 292 also includes five pipe unions 298, each of which includes a first attachment end 300 within the cabinet 10 on one side of the adapter plate 294 and a second attachment end 302 outside of the cabinet 10 on the opposite side of the adapter plate 294. In one embodiment, each attachment end 300, 302 includes a threaded coupling. Five water pipes 304a, 304b, 304c, 304d, 304e (collectively referred to as the piping system 304) connect between the tank 18 and the first ends 300a, 300b, 300c, 300d, 300e of the pipe unions 298. Five water pipes 168a, 168b, 168c, 168d, 168e (collectively referred to as the building's plumbing system 168) extend up from the building and through the roof curb 42 to connect to the second attachment ends 302*a*, 302*b*, 302*c*, 302*d*, 302*e* of the pipe unions 298.

The adapter plate 294 is rigidly mounted to base member 78 and lends structural stability to the manifold 292. The rigid connection allows each of the water pipes 168, 304 to be connected with and disconnected from its respective end 300, 302 of the pipe union 298 regardless of whether or not a pipe 168, 304 is connected or disconnected to the opposite end 300, 302 of that specific pipe union 298. The freedom to independently connect and disconnect the water pipe 168, 304 from their respective pipe union 298 simplifies the service of the water heater by allowing easier removal and replacement of the water pipes 168, 304.

Figure 18:
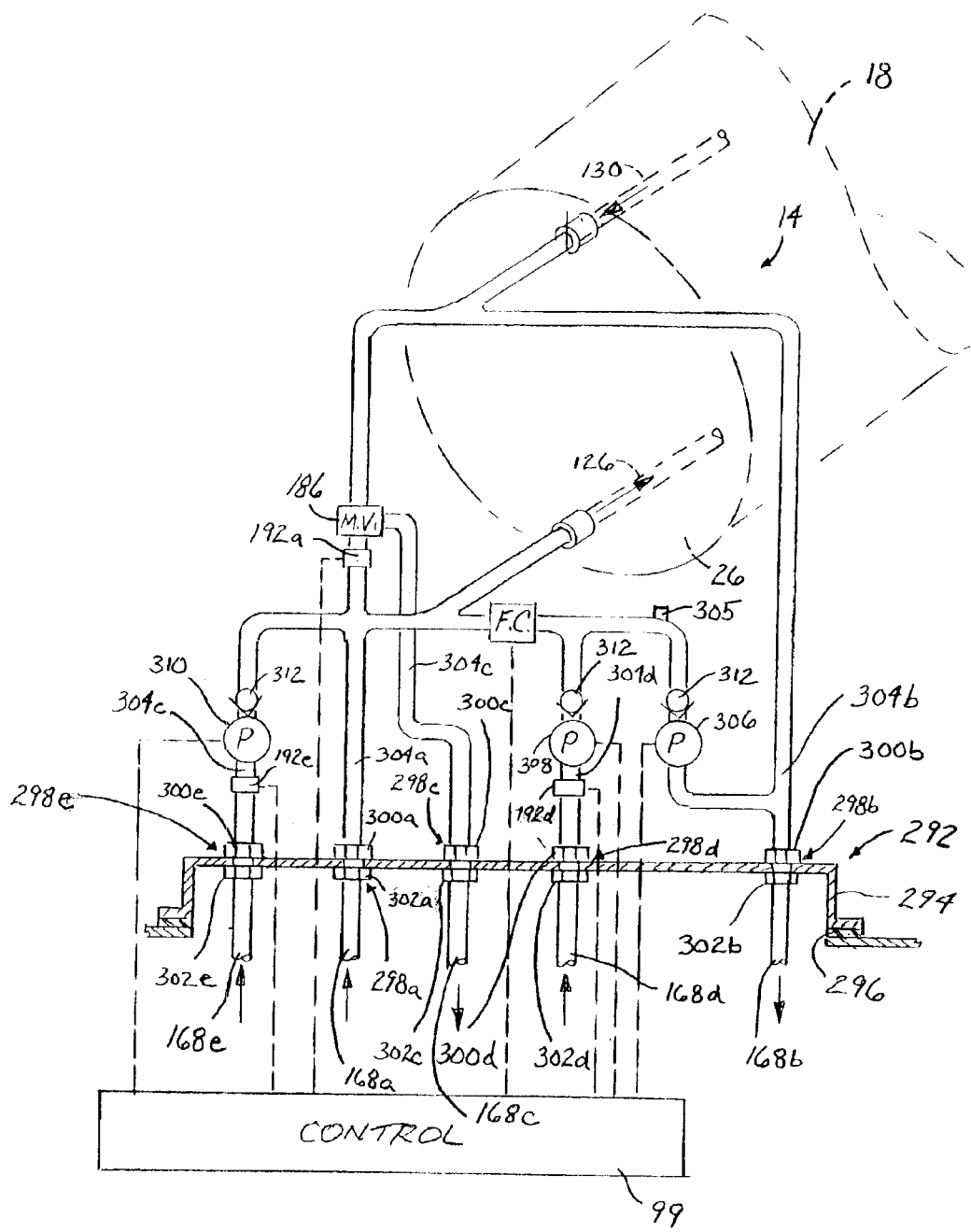
FIG. 18 is a schematic illustration of the piping system associated with the tank assembly of FIG. 17.

FIG. 18 illustrates the piping system 304 associated with the tank assembly 14. The piping system 304 includes a bleed vent 305 at the high point of the piping system 304. The bleed vent 305 allows air to bleed from the piping system 304 during startup. A cold water supply pipe 168*a* is connected to one end 302*a* of a first pipe union 298*a*, and a cold water inlet pipe 304*a* is connected between the other end 300*a* of the first pipe union 298*a* and the inlet tube 126. In this manner, the cold water inlet pipe 304*a* provides cold water to the water inlet tube 126.

A hot water pipe 168*b* of the plumbing system is connected is connected to one end 302*b* of a second pipe union 298*b*, and a hot water outlet pipe 304*b* is connected between the other end 300*b* of the second pipe union 298*b* and the outlet tube 130 such that the hot water outlet pipe 304*b* removes hot water from the tank 18 through the outlet tube 130. This hot water is used for dishwashers and other applications requiring very hot water (e.g., between about 120° F. and about 150° F., or a higher temperature if necessary).

A mixed water pipe 168*c* of the plumbing system is connected to one end 302*c* of a third pipe union 298*c*, and a mixed water outlet pipe 304*c* is connected between the other end 300*c* of the third pipe union 298*c* and a mixing valve 186 such that the mixed water outlet pipe 304*c* delivers a mixture of hot water and cold water through the mixed water pipe 168*c* to the warm water faucets of the building's bathroom and kitchen sinks.

A first circulation pump 306 causes hot water to be drawn off the top of the water tank 18 through the outlet tube 130 and hot water outlet pipe 304*b* and recirculated through the cold inlet tube 126 to even out the temperature of the water in the tank 18 and reduce the effects of stacking. The first circulation pump 306 is turned on by the controller 99, 100 each time the combustion blower 110 is turned on, and remains active for a set period of time (e.g., about nine minutes) after the combustion blower 110 is turned off. The first circulation pump 306 routes water from the outlet tube 130, through the first circulation pump 306, and back into the tank 18 through the inlet tube 126. The piping system 304 also includes a flow control valve FC that may be used to control the flow rate of the water recirculated by the first circulation pump 306 into and out of the water tank 18. The flow control valve FC preserves a minimal amount of stacking effects within the tank 18 to maintain the most heated water near the top of the tank 18 for a hot water draw.

Having a dedicated pump 306 within the cabinet 10 allows recirculation of the tank 18 without recirculating the water throughout the entire plumbing system 168 of the building. Because the first circulation pump 306 does not use the building's plumbing system 168 to recirculate the water within the tank 18, operation of the first circulation pump 306 is not affected by the opening and closing of a recirculation valve in the building's plumbing system 168 during service of the building's plumbing system 168.

A hot water return pipe 168*d* communicates between the building's hot water pipes 168*b* and one end 302*d* of a fourth pipe union 298*d*. A hot water return pipe 304*d* of the piping system is connected between the other end 300*d* of the fourth pipe union 298*d* and a second circulation pump 308. The second circulation pump 308 maintains a supply of hot water in the hot water pipes 168*b* of the building. A thermostat or temperature sensor 192*d* may be employed to determine when the temperature in the building's hot water pipes 168*b* has dropped below a desired temperature (e.g., when a hot water draw has not occurred for an extended period of time). In this case, the second circulation pump 308 is activated to circulate the water in the building's hot water pipes 168*b*, into the hot water return pipe 304*d* of the piping system 304 and into the inlet tube 126, which forces hot water out the outlet tube 130, into the hot water outlet pipe 304*b* and into the building's hot water pipes 168*b*. The hot water replaces the water in the building's hot water pipes 168*b*. The flow control valve FC may be used to control the flow rate of the water recirculated by the second circulation pump 308 into and out of the water tank 18. In one embodiment, the flow control valve FC allows the water to flow at approximately four gallons per minute.

A mixed water return pipe 168*e* communicates between the building's mixed water pipes 168*c* and one end 302*e* of a fifth pipe union 298*e*. A mixed water return pipe 304*e* of the piping system 304 is connected between the other end 300*e* of the fifth pipe union 298*e* and a third circulation pump 310. The third circulation pump 310 maintains a supply of mixed water in the mixed water pipes 168*c* of the building. A thermostat or temperature sensor 192*e* may be employed to determine when the temperature in the building's mixed water pipes 168*c* has dropped below a desired temperature (e.g., when a mixed water draw has not occurred for an extended period of time). In this case, the third circulation pump 310 is activated to circulate the water in the building's mixed water pipes 168*c* partially into the mixing valve 186 and partially into the inlet tube 126, which forces an equal amount of hot water out the outlet tube 130 and into the mixing valve 186. From the mixing valve 186, mixed hot and returned warm water are distributed to the mixed water pipes 168*c* to replace the water in the building's mixed water pipes 168*c*.

Each of the circulation pumps 306, 308, 310 includes a one-way check valve 312 that ensures unidirectional flow when each of the circulation pumps 306, 308, 310 are activated. Because they are in the pumps 306, 308, 310, there is no need for external check valves.

The cabinet 10 and piping system 304 within the cabinet 10 are preferably mounted outside of a building, and, as such, are exposed to the temperature of the outside atmosphere. In environments where the temperature reaches below freezing, the water within the piping system 304 could potentially freeze, cracking the pipes of the piping system 304. In order to minimize the risk of water freezing within the piping system 304, each of the circulation pumps 306, 308, 310 can be activated to replace the near-freezing water with warmer water. Additional thermostats 192, such as thermostat 192*a* can be used to measure when the temperature of the water in the piping system 304 has dropped below a safe temperature. In this case, one or all of the pumps 306, 308, 310 can be activated by the controller 99, 100 to increase the temperature of the water within the water within the piping system 304.

The invention provides a self-contained water heating system conveniently assembled within a cabinet 10 allowing the water heater to be easily assembled to the plumbing system 168 of a building. Specifically, there is no need for any pumps, sensors, or valves external to the cabinet 10 because the water heater includes all of these components already assembled for operation within the cabinet 10. Additionally, the controls 99, 100 of the water heater are pre-wired allowing the water heater to be completely ready for operation as soon as the building's plumbing system 168 has been connected to the manifold 292 and the gas supply is connected to the burner. Another advantage is that the water heater includes modular parts (e.g., tank, burner, manifold, pumps, piping system) that allow for removal and replacement without disconnecting the building's plumbing system 168 from the manifold 292.

Figure 19:
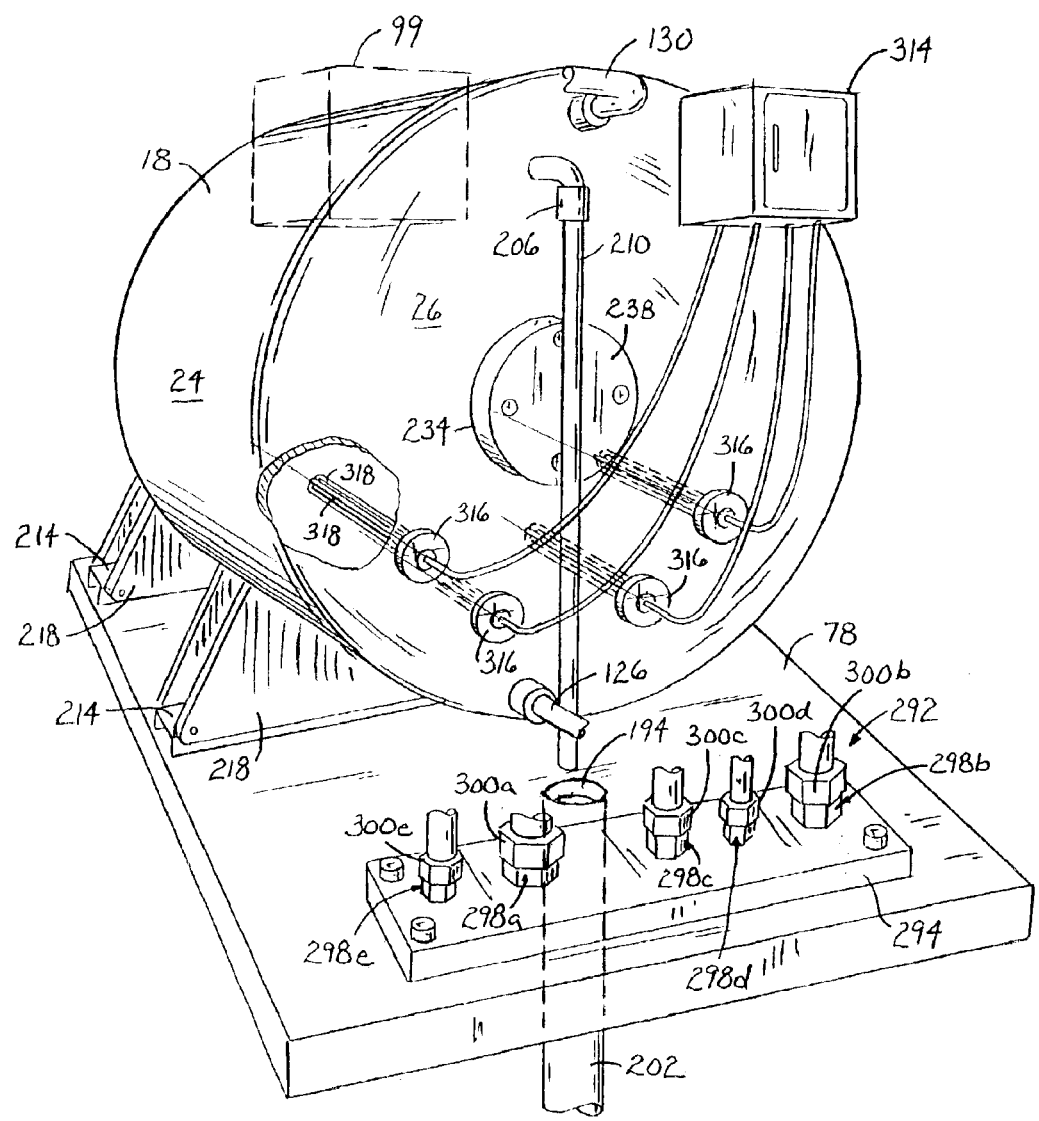
FIG. 19 is a perspective view of an electric water heater according to another embodiment of the present invention.

An electric water heater according to another embodiment of the present invention is illustrated in FIG. 19. Reference numbers used with respect to the embodiments illustrated in FIGS. 1–18 are also used in FIG. 19 to indicate like components. The electric water heater is substantially similar to the water heater illustrated in FIGS. 14–18 except that the electric water heater is heated electrically. Because the electric water heater is heated electrically, the electric water heater does not include a fuel gas burner 114 and other components associated with the burner 114 such as a blower 110, an air inlet vent 102, an air inlet duct 112, a flue tube 30, an exhaust duct 280, and exhaust vents 278. Rather, the electric water heater includes an electrical heating control 314 electrically connected to four electrical heaters 316. Alternatively, less than four heaters 316 may be used, and the unused sockets may be plugged. Each electrical heater 316 includes multiple U-shaped heating elements 318. The electrical heaters are located near the bottom of the tank 18 and are substantially equally spaced from each other.

What is claimed is:

1. A water heater adapted to be positioned outside of a building and to interface with the plumbing system of the building, said water heater comprising:
    a water storage tank adapted to store water outside of the building;
    means for heating the water in said tank;
    a base member supporting said tank outside of the building;
    a plurality of water pipes communicating with said water tank;
    a manifold mounted to said base member and including a plurality of pipe unions adapted to interface between the plumbing system and said plurality of pipes to provide cold water to said tank and to remove heated water from said tank for use in the building; and
    a cabinet supported by said base and weather-tightly enclosing said water tank, means for heating, and plurality of pipes.

2. The water heater of claim 1, wherein said manifold is rigidly affixed to said base member to resist movement of said water pipes with respect to said manifold.

3. The water heater of claim 1, wherein said manifold unions are rigidly fixed with respect to said base and wherein said plumbing system of the building is connectable to and disconnectable from said unions without regard to whether said plurality of pipes are connected to said unions.

4. The water heater of claim 1, further comprising a gasket interposed between said manifold and said base member to create a substantially water-tight seal therebetween.

5. The water heater of claim 1, wherein said unions extend through said base such that said plurality of pipes interconnect with said unions on one side of said base and the plumbing system interconnects with said unions on the other side of said base.

6. The water heater of claim 1, wherein said means for heating includes at least one electrical element converting electricity into heat energy for heating the water within said tank.

7. The water heater of claim 1, wherein said means for heating includes a gas fuel burner creating hot products of combustion and a flue tube within said tank for the flow of the products of combustion.

8. A water heater adapted to be positioned outside of a building and to interface with the plumbing system of the building, said water heater comprising:
    a water storage tank adapted to store water outside of the building;
    means for heating the water in said tank;
    a base member supporting said tank outside of the building;
    a plurality of water pipes communicating with said water tank; and
    a manifold mounted to said base member and including a plurality of pipe unions adapted to interface between the plumbing system and said plurality of pipes to provide cold water to said tank and to remove heated water from said tank for use in the building;
    wherein said base member includes a roof curb adapted to be mounted on a roof of the building around a hole in the roof such that the water heater and plumbing system are interconnected through the hole.

9. A water heater adapted to be positioned outside of a building and to interface with the plumbing system of the building, said water heater comprising:
    a water storage tank adapted to store water outside of the building;
    means for heating the water in said tank;
    a base member supporting said tank outside of the building;
    a plurality of water pipes communicating with said water tank; and
    a manifold mounted to said base member and including a plurality of pipe unions adapted to interface between the plumbing system and said plurality of pines to provide cold water to said tank and to remove heated water from said tank for use in the building;
    wherein said base member includes a concrete pad mounted on the ground outside of the building.

10. The water heater of claim 1, wherein said base member is elevated above a predicted flood level of the area surrounding said water heater such that said water tank is supported by said base member above the flood level.

11. The water heater of claim 1, further comprising a bleed vent in the highest point of at least one of said plurality of pipes to facilitate bleeding air from said at least one pipe.

12. The water heater of claim 1, wherein said tank includes a rounded surface, said water heater further comprising a mounting bracket affixed to said rounded surface, and a wedge-shaped support supported by said base member and interconnected with said mounting bracket to support said tank above said base member.

13. The water heater of claim 12, further comprising a thermally insulated spacer interposed between said mounting bracket and said wedge-shaped support.

14. The water heater of claim 1, further comprising an outlet spud and an inlet spud mounted on said tank and communicating between the inside of said tank and selected ones of said plurality of pipes.

15. A water heater adapted to be positioned outside of a building and to interface with the plumbing system of the building, said water heater comprising:
- a water storage tank adapted to store water outside of the building;
- means for heating the water in said tank;
- a base member supporting said tank outside of the building;
- a plurality of water pipes communicating with said water tank;
- a manifold mounted to said base member and including a plurality of pipe unions adapted to interface between the plumbing system and said plurality of pipes to provide cold water to said tank and to remove heated water from said tank for use in the building;
- an outlet spud and an inlet spud mounted on said tank and communicating between the inside of said tank and selected ones of said plurality of pipes; and
- at least one recirculation pump for simultaneously displacing water in selected pipes of the plumbing system into said tank through at least one of said manifold unions, at least one of said plurality of pipes, and said inlet spud and replacing the so-displaced water with water from said tank through said outlet spud, at least one of said plurality of pipes, and at least one of said manifold unions.

16. The water heater of claim 15, wherein said recirculation pump includes an integral check valve permitting the flow of water in only one direction through said pump.

17. The water heater of claim 15, wherein said at least one recirculation pump includes a hot water recirculation pump and a separate mixed water recirculation pump for the displacement and replacement of hot water and mixed water, respectively, in the plumbing system.

18. The water heater of claim 15, further comprising a flow control valve communicating between the plumbing system and said plurality of pipes to limit the rate of flow of displaced water into said tank.

19. The water heater of claim 18, wherein said selected rate is about four gallons per minute.

20. The water heater of claim 14, wherein said plurality of pipes includes a cold water inlet pipe communicating through one of said manifold unions between the cold water supply of the plumbing system and said inlet spud, a hot water outlet pipe communicating through one of said manifold unions between said outlet spud and the hot water supply pipes of the plumbing system, a hot water return pipe communicating through one of said manifold unions between said inlet spud and the hot water pipes of the plumbing system, a mixing valve communicating between said hot water outlet pipe and said cold water inlet pipe, a mixed water outlet pipe communicating through one of said manifold unions between said mixing valve and the mixed water pipes of the plumbing system, and a mixed water return pipe communicating through one of said manifold unions between said inlet spud and the mixed water pipes of the plumbing system.

21. The water heater of claim 20, wherein said mixing valve includes an integral check valve permitting flow of water in only a single direction through said mixing valve.

22. The water heater of claim 1, wherein said cabinet includes front and rear panels and first and second side panels extending between said front and rear panels, said front and rear panels being substantially identical to each other and said side panels being substantially identical to each other.

23. The water heater of claim 22, wherein said front, rear, and side panels are interconnected with each other without the use of fasteners.

24. The water heater of claim 1, wherein said base member includes a drain therethrough for draining water from inside said cabinet, and wherein said drain provides the only path for water outside of said plurality of pipes to escape through said base member.

25. The water heater of claim 1, further comprising a mixing valve; wherein said mixing valve provides for the delivery of mixed hot and cold water to the plumbing system through one of said manifold unions, said mixing valve being disposed within said cabinet.

26. The water heater of claim 1, wherein said unions extend through said base such that said plurality of pipes interconnect with said unions within said cabinet and the plumbing system interconnects with said unions outside of said cabinet.

27. The water heater of claim 1, wherein said means for heating includes a gas burner and a flue tube within said tank communicating with said gas burner for the flow of hot products of combustion from said burner through said flue to heat water in said tank, said water heater further comprising a vent communicating with said flue for the removal of the products of combustion from said flue and out of said cabinet, said vent including first and second ducts within said cabinet and extending through first and second sides, respectively, of said cabinet.

28. The water heater of claim 27, wherein said vent is substantially T-shaped.

29. The water heater of claim 27, wherein said first and second ducts are interconnected with a slip-fit connection including a sealing member to resist the escape of products of combustion through said slip-fit connection.

30. The water heater of claim 27, further comprising a blocking member resisting the flow of products of combustion out of one of said ducts, and a vent outlet mounted to the end of the other duct to weather-tightly exhaust the products of combustion out of said cabinet.

31. The water heater of claim 30, wherein said vent outlet includes a vertical riser extending upwardly outside of said cabinet to elevate the products of combustion with respect to said water heater prior to exhausting said products of combustion to the atmosphere surrounding said water heater.

32. The water heater of claim 1, further comprising at least one recirculation pump for simultaneously displacing water in the pipes of the plumbing system into said tank through at least one of said manifold unions and at least one of said plurality of pipes and replacing the so-displaced water with water from said tank through at least one of said plurality of pipes and at least one of said manifold unions, said at least one recirculation pump being disposed within said cabinet.

33. The water heater of claim 32, wherein said at least one recirculation pump includes a hot water recirculation pump and a separate mixed water recirculation pump for the displacement and replacement of hot water and mixed water, respectively, in the plumbing system; and wherein both of said hot water and mixed water recirculation pumps are disposed within said cabinet.

34. A water heater adapted to be positioned outside of a building and to interface with the plumbing system of the building, said water heater comprising:
- a water storage tank adapted to store water outside of the building;
- a gas burner;
- a flue tube within said tank communicating with said gas burner for the flow of hot products of combustion from said burner through said flue tube to heat water in said tank;

a cabinet surrounding said tank and supporting said tank outside of the building; and a vent communicating with said flue tube for the removal of the products of combustion from said flue tube and out of said cabinet, said vent including first and second ducts within said cabinet and extending through first and second sides, respectively, of said cabinet;

wherein said first and second ducts are interconnected with a slip-fit connection including a sealing member to resist the escape of products of combustion through said slip-fit connection.

35. The water heater of claim 34, wherein said vent is substantially T-shaped.

36. The water heater of claim 34, further comprising a blocking member resisting the flow of products of combustion out of one of said ducts, and a vent outlet mounted to the end of the other duct to weather-tightly exhaust the products of combustion out of said cabinet.

37. The water heater of claim 36, wherein said vent outlet includes a vertical riser extending upwardly outside of said cabinet to elevate the products of combustion with respect to said water heater prior to exhausting said products of combustion to the atmosphere surrounding said water heater.

38. A water heater assembly adapted to be positioned outside of a building and to interface with the plumbing system of the building, said water heater assembly comprising:

a water heater including a water storage tank adapted to store water outside of the building, means for heating the water in said tank, and a plurality of water pipes communicating with said water tank;

a cabinet surrounding the water heater; and a manifold mounted to said cabinet to interface between the plumbing system and said plurality of pipes to provide cold water to said tank within the cabinet and to remove heated water from said tank and said cabinet for use in the building;

wherein said cabinet includes a base member elevated above a predicted flood level of the area surrounding said water heater such that said water tank is supported by said base member above the flood level.

39. A water heater assembly adapted to be positioned outside of a building and to interface with the plumbing system of the building, said water heater assembly comprising:

a water heater including a water storage tank adapted to store water outside of the building, means for heating the water in said tank, and a plurality of water pipes communicating with said water tank;

a cabinet surrounding the water heater; and a manifold mounted to said cabinet to interface between the plumbing system and said plurality of pipes to provide cold water to said tank within the cabinet and to remove heated water from said tank and said cabinet for use in the building;

wherein said cabinet includes a base supporting said water heater, said cabinet weather-tightly enclosing said water heater; and wherein said cabinet includes front and rear panels and first and second side panels extending between said front and rear panels, said front and rear panels being substantially identical to each other and said side panels being substantially identical to each other.

40. The water heater assembly of claim 39, wherein said front, rear, and side panels are interconnected with each other without the use of fasteners.

* * * * *